United States Patent
Chen et al.

(10) Patent No.: US 9,872,289 B2
(45) Date of Patent: *Jan. 16, 2018

(54) BLIND DECODING FOR AN ENHANCED PHYSICAL DOWNLINK CONTROL CHANNEL (EPDCCH)

(71) Applicant: INTEL CORPORATION, Santa Clara, CA (US)

(72) Inventors: Xiaogang Chen, Hillsboro, OR (US); Seunghee Han, San Jose, CA (US); Yuan Zhu, Beijing (CN); Qinghua Li, San Ramon, CA (US); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,623

(22) Filed: Dec. 9, 2016

(65) Prior Publication Data
US 2017/0127388 A1    May 4, 2017

Related U.S. Application Data

(63) Continuation of application No. 14/882,289, filed on Oct. 13, 2015, now Pat. No. 9,549,404, which is a (Continued)

(51) Int. Cl.
*H04W 72/04*    (2009.01)
*H04L 1/00*    (2006.01)

(52) U.S. Cl.
CPC ......... *H04W 72/042* (2013.01); *H04L 1/0013* (2013.01); *H04W 72/0446* (2013.01)

(58) Field of Classification Search
CPC .............................. H04L 43/50; H04W 24/00
See application file for complete search history.

(56) References Cited

U.S. PATENT DOCUMENTS 9,167,574 B2 * 10/2015 Chen .................. H04W 72/042
9,549,404 B2 *  1/2017 Chen .................. H04W 72/042
(Continued)

FOREIGN PATENT DOCUMENTS

CN    101931600 A    12/2010
CN    104221437 A    12/2014
(Continued)

OTHER PUBLICATIONS

3GPP TS 36.211 V1 0.5.0, "Technical Specification Group Radio Access Network, Evolved Universal Terrestrial Radio Access (E-UTRA), Physical Channels and Modulation", Release 10, Jun. 2012, 102 pages.

(Continued)

*Primary Examiner* — Afshawn Towfighi
(74) *Attorney, Agent, or Firm* — Thorpe North & Western

(57) ABSTRACT

Technology for a user equipment (UE) configured for blind decoding downlink control information (DCI) from an enhanced physical downlink control channel (EPDCCH) is disclosed. The UE can receive, from a base station, the EPDCCH that includes the DCI. The UE can attempt one or more times to decode the DCI from enhanced control channel elements (ECCE) of the EPDCCH from physical resource block (PRB) region candidates in a PRB set using a selected set of enhanced resource element group (EREG) index maps for the ECCE until the DCI is successfully decoded.

26 Claims, 15 Drawing Sheets

Related U.S. Application Data continuation of application No. 13/931,102, filed on Jun. 28, 2013, now Pat. No. 9,167,574.

(60) Provisional application No. 61/721,436, filed on Nov. 1, 2012, provisional application No. 61/719,241, filed on Oct. 26, 2012, provisional application No. 61/707,784, filed on Sep. 28, 2012.

(56) References Cited

U.S. PATENT DOCUMENTS

| | | | |
|---|---|---|---|
| 2010/0272040 A1 | 10/2010 | Nam et al. | |
| 2013/0100901 A1* | 4/2013 | Shan | H04L 5/0048 370/329 |
| 2014/0086063 A1* | 3/2014 | Wu | H04W 24/00 370/241 |

FOREIGN PATENT DOCUMENTS

| | | |
|---|---|---|
| WO | WO 2011/159132 A2 | 12/2011 |
| WO | WO 2012/109542 A1 | 8/2012 |

OTHER PUBLICATIONS

Fujitsu, 36GPP TSG RAN WG1, "Definition of eREG and eCCE", R1-122068, Meeting #69, May 21-25, 2012, 4 pages.

Huawei, HiSilicon, 3GPP TSG RAN WG1, "Search Space Design for ePDCCH", R1-123120, Meeting #70, Aug. 13-17, 2012, 6 pages.

Intel Corporation, 3GPP TSG RAN WG1, "UE-RS Multiplexing for Multiple CCEs", R1-121534, Meeting #68bis, Mar. 26-30, 2012, 7 pages.

Motorola Mobility, 3GPP TSG RAN WG1, "Configuration of EPDCCH", R1-123788, #70, Aug. 13-18, 2012, 6pages.

Panasonic, 3GPP TSG RAN WG1, "Type 0 and Type 2 POSCH Assignment on Resources including ePDCCH Allocation", R1-122205, Meeting #69, May 21-25, 2012, 3 pages.

ETSI TS 136 211; "LTE; Evolved Universal Terrestrial Radio Access (E-UTRA); Physical channels and modulation"; 3GPP TS 36.211; (Jul. 2012); 103 pages; V10.5.0, Release 10.

Extended European Search Report dated Aug. 7, 2017; in EP Application No. 17165456.9; filed Sep. 17, 2013; 8 pages.

LG Electronics; "Consideration on DCI mapping for EPDCCH"; 3GPP TSG R1-123526; (Aug. 13-17, 2012); 7 pages; RAN WG1 Meeting #70, Qingdao, China; Agenda: 7.6.1.

Interdigital Communications, LLC; "On details of eREG/eCCE definition of ePDCCH"; 3GPP TSG R1-123407; (Aug. 13-17, 2012); 6 pages; RAN WG1 Meeting #70, Qingdao, China; Agenda: 7.6.1.

Huawei, Hisilicon; "Antenna port association for ePDCCH"; 3GPP TSG R1-123560; (Aug. 13-17, 2012); 6 pages; RAN WG1 Meeting #70, Qingdao, China; Agenda: 7.6.4.

Intel Corporation; "Blind Decoding Ambiguity Resolution"; 3GPP TSG R1-124731; (Nov. 12-16, 2012); 5 pages; RAB WG1 #71, New Orleans, USA; Agenda: 6.2.3.7.

\* cited by examiner

BLIND DECODING FOR AN ENHANCED PHYSICAL DOWNLINK CONTROL CHANNEL (EPDCCH)

RELATED APPLICATIONS

This application is a continuation of U.S. patent application Ser. No. 14/882,289, filed Oct. 13, 2015, which is a continuation of U.S. patent application Ser. No. 13/931,102, filed Jun. 28, 2013, which claims the benefit of U.S. Provisional Patent Application Ser. No. 61/721,436, filed Nov. 1, 2012, and U.S. Provisional Patent Application Ser. No. 61/707,784, filed Sep. 28, 2012, and U.S. Provisional Patent Application Ser. No. 61/719,241, filed Oct. 26, 2012, all of which are hereby incorporated by reference in their entirety.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNodeB to the UE.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
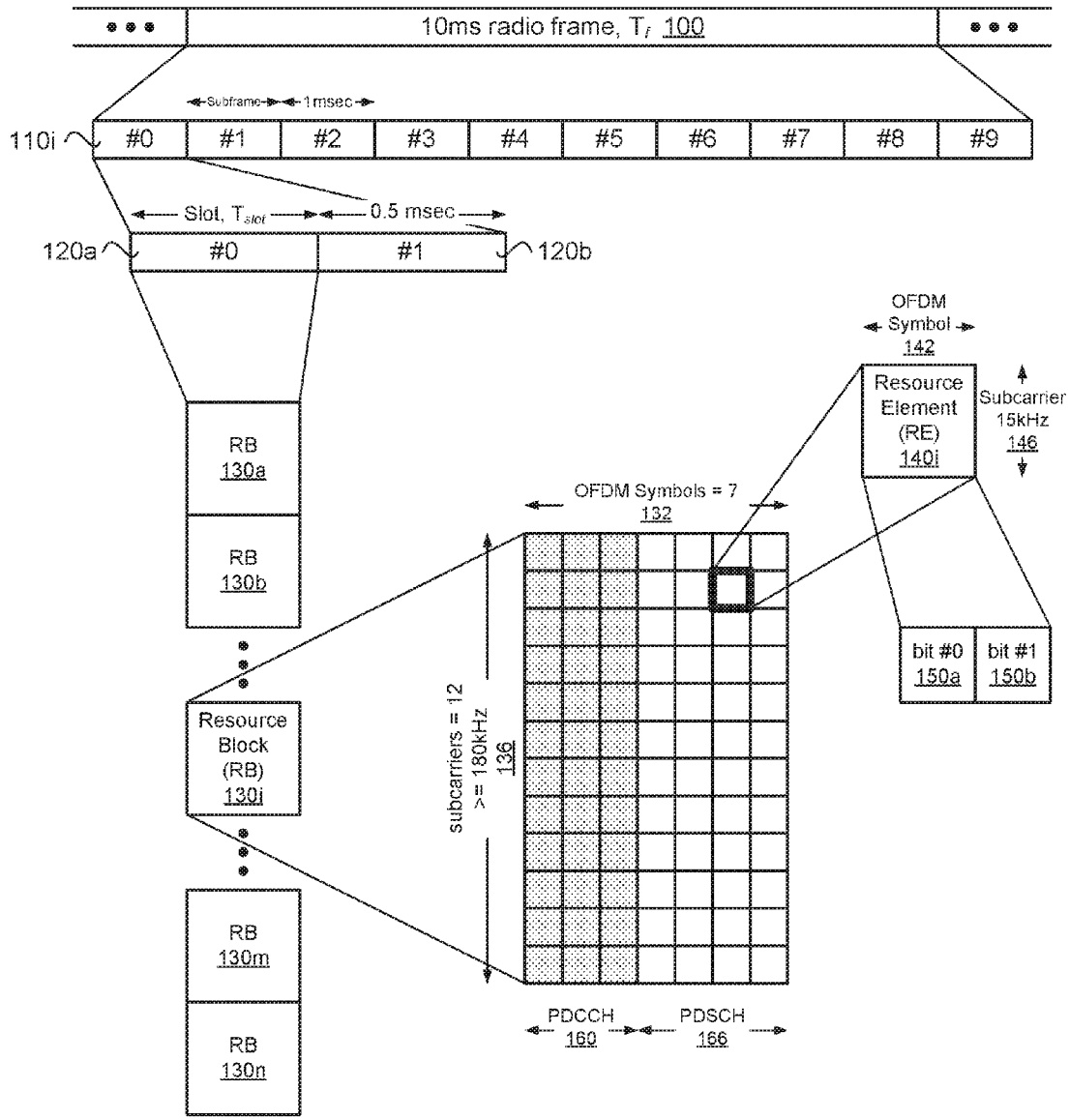
FIG. 1 illustrates a diagram of radio frame resources (e.g., a resource grid) for a downlink (DL) transmission including a legacy physical downlink control channel (PDCCH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the physical downlink shared channel (PDSCH) can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or the PDSCH scheduling grant can be designated to all wireless devices in the cell for common PDSCH resource allocation to carry broadcast control information such as system information or paging.

In one example, the PDCCH and PDSCH can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 1.

FIG. 1 illustrates a downlink radio frame structure type 1. In the example, a radio frame 100 of a signal used to transmit the data can be configured to have a duration, Tf, of 10 milliseconds (ms). Each radio frame can be segmented or divided into ten subframes 110i that are each 1 ms long. Each subframe can be further subdivided into two slots 120a and 120b, each with a duration, Tslot, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
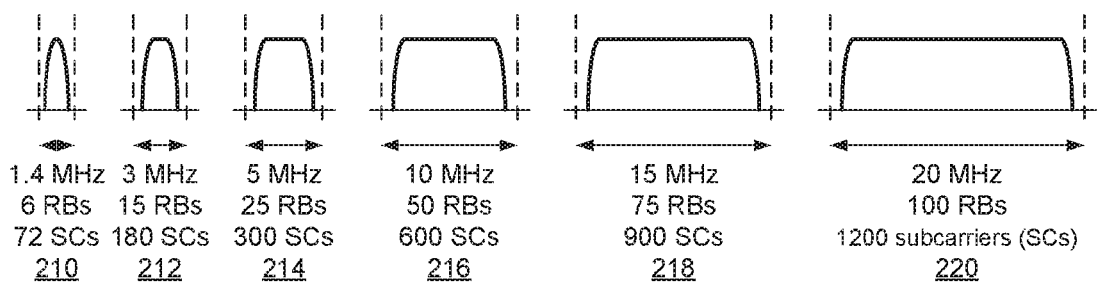
FIG. 2 illustrates a diagram of various component carrier (CC) bandwidths in accordance with an example.

Each wireless device may use at least one bandwidth. The bandwidth may be referred to as a signal bandwidth, carrier bandwidth, or component carrier (CC) bandwidth, as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each legacy REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one legacy PDCCH.

The legacy PDCCH can create limitations to advances made in other areas of wireless communication. For example, mapping of CCEs to subframes in OFDM symbols can typically be spread over the control region to provide frequency diversity. However, no beam forming diversity may be possible with the current mapping procedures of the PDCCH. Moreover, the capacity of the legacy PDCCH may not be sufficient for advanced control signaling.

To overcome the limitations of the legacy PDCCH, an enhanced PDCCH (EPDCCH) can use the REs in an entire PRB or PRB pair (where a PRB pair can be two contiguous PRBs using the same subcarrier's subframe), instead of just the first one to three columns of OFDM symbols in a first slot PRB in a subframe as in the legacy PDCCH. Accordingly, the EPDCCH can be configured with increased capacity to allow advances in the design of cellular networks and to minimize currently known challenges and limitations.

Unlike the legacy PDCCH, the EPDCCH can be mapped to the same REs or region in a PRB as the PDSCH, but in different PRBs. In an example, the PDSCH and the EPDCCH may not be multiplexed within a same PRB (or a same PRB pair). Thus if one PRB (or one PRB pair) contains an EPDCCH, the unused REs in the PRB (or PRB pair) may be blanked, since the REs may not be used for the PDSCH. The EPDCCH can be localized (e.g., localized EPDCCH) or distributed (e.g., distributed EPDCCH). Localized EPDCCH can refer to the entire EPDCCH (e.g., EREGs or ECCEs) within the PRB pair. Distributed EPDCCH can refer to EPDCCH (e.g., EREGs or ECCEs) spread over plurality of PRB pairs.

Blind decoding can be used to detect a UE's DCI, including the DCI transmitted in the legacy PDCCH. The UE may only be informed of the number of OFDM symbols within the control region of a subframe and may not be provided with an exact location of the UE's corresponding PDCCH. The PDCCH or EPDCCH can provide control information to multiple UEs in a cell for each subframe k. The UE can perform blind decoding since the UE may be aware of the detailed control channel structure, including the number of control channels (CCHs) and the number of control channel elements (CCEs) to which each control channel is mapped. Multiple PDCCHs can be transmitted in a single subframe k which may or may not be relevant to a particular UE. Because the UE does not know the precise location of the DCI information in a PDCCH, the UE can search and decode the CCEs in the PDCCH until the DCI is found for the UE's CCs. The PDCCH candidates for DCI detection can be referred to as a search space. The UE can find the PDCCH specific to the UE (or the UE's CCs) by monitoring a set of PDCCH candidates (a set of consecutive CCEs on which the PDCCH could be mapped) in a PDCCH search space in each subframe.

In the 3GPP LTE specification, such as in Release 8, 9, 10, or 11, the UE can use a radio network temporary identifier (RNTI) that can be assigned to the UE by the eNB to try and decode candidates. The RNTI can be used to demask a PDCCH candidate's cyclic redundancy check (CRC) that was originally masked by the eNB using the UE's RNTI. If the PDCCH is for a specific UE, the CRC can be masked with a UE unique identifier, for example a cell-RNTI (C-RNTI) used in a downlink. If no CRC error is detected the UE can determine that a PDCCH candidate carries the DCI for the UE. If a CRC error is detected then the UE can determine that PDCCH candidate does not carry the DCI for the UE and the UE can increment to the next PDCCH candidate. The UE may increment to the next PDCCH candidate in the search space based on the CCE aggregation level (AL).

The number of CCEs used to transmit one piece of control information can be determined according to the transmission mode, the receiving quality of the PDCCH allocated to the UE, or the channel quality of the UE, and the number of CCEs is referred to as a CCE aggregation level, a legacy aggregation level L∈{1,2,4,8}, an enhanced control channel elements (ECCE) aggregation level L∈{1,2,4,8,16,32}, or just aggregation level (AL). The aggregation level can be used to determine the size of a search space or the number of CCEs (or ECCEs) forming a search space, and/or the number of control channel (CCH) candidates in a search space. The aggregation level of the UE's DCI may not be known at the UE, which can be referred to as aggregation level ambiguity. During blind decoding, the UE may assume an AL. For blind decoding ECCEs, the UE may also assume a lowest ECCE value used to transmit DCIs. The lowest ECCE value of the DCIs may not be known at the UE, which can be referred to as lowest ECCE ambiguity. The ECCE and an enhanced resource element group (EREG) can be associated with EPDCCH, and CCE and REG can be associated with PDCCH.

Figure 3:
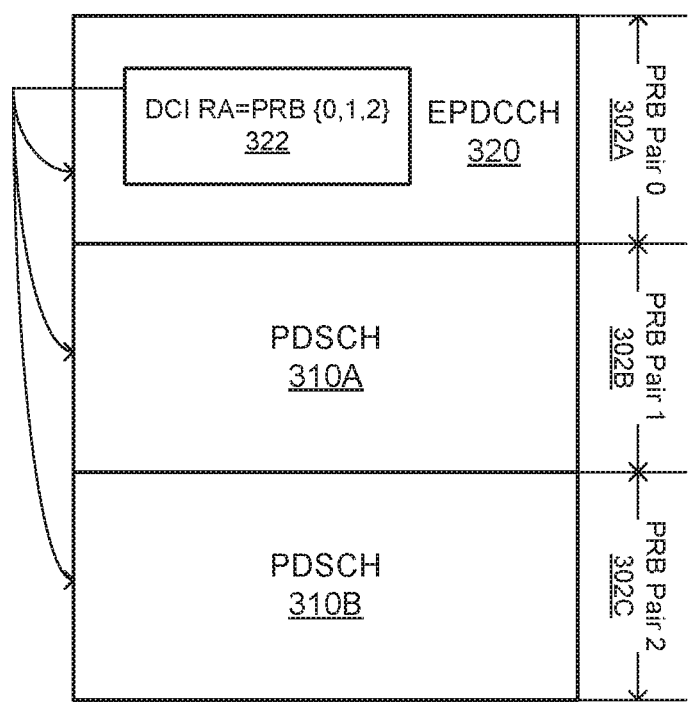
FIG. 3 illustrates a diagram of enhanced physical downlink control channel (EPDCCH) and physical downlink shared channel (PDSCH) multiplexing in accordance with an example.

Aggregation level ambiguity (ALA) can cause performance degradation for PDSCH, especially when EPDCCHs are transmitted with PDSCHs. When a UE detects the UE's DL assignment defining a PDSCH allocation which can overlap with the PRB pair(s) containing the DL assignment (e.g., EPDCCH), the UE can assume that the PDSCH scheduled by the DL assignment is rate-matched around the PRB pair(s) containing the UE's DL assignment, as illustrated in FIG. 3. A resource allocation can include three PRB pairs (e.g., two contiguous slots). A PRB pair 0 302A can include the EPDCCH 320 used to transmit the DCI resource allocation (RA) 322 for PRB pair 0, 1, and 2. A PRB pair 1 302B and PRB pair 2 302C can include the PDSCH 310A-B.

The rate matching (RM) process can adapt the code rate of the LTE data transmissions such that the number of information and parity bits to be transmitted matches the resource allocation. For example, based on a 1/3 mother code rate of the turbo coder, the LTE rate matching can use a circular buffer to either repeat bits to decrease the code rate or puncture bits to increase the code rate.

Figure 4:
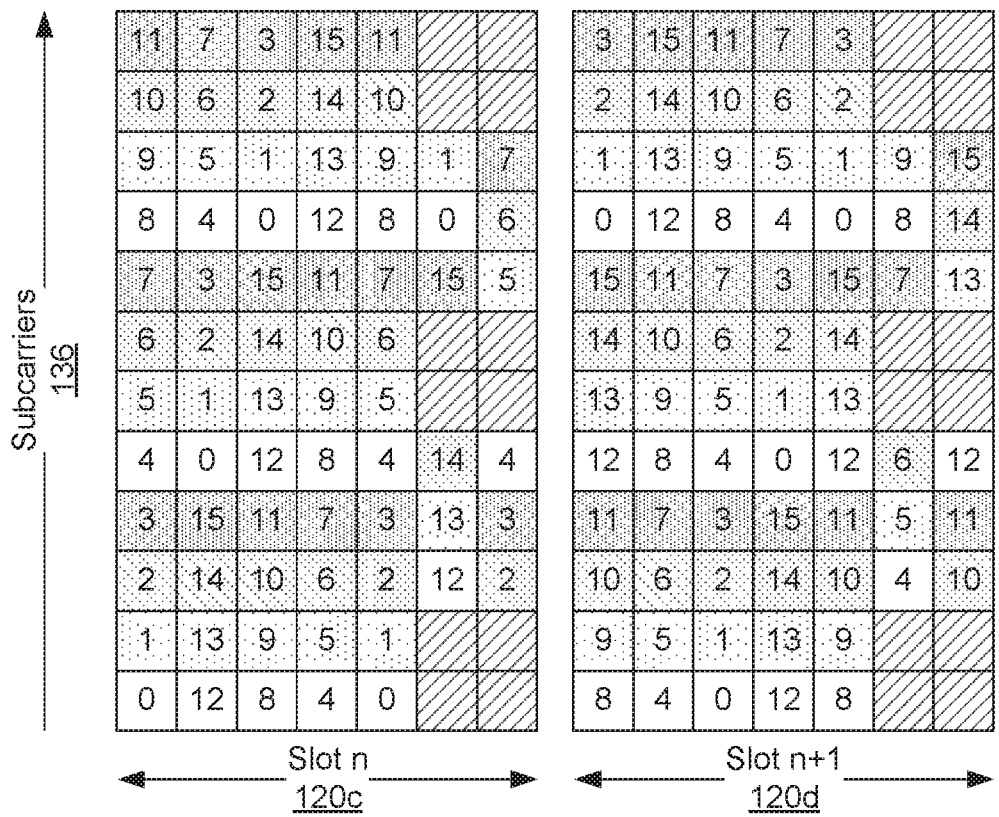
FIG. 4 illustrates a diagram of four enhanced control channel elements (ECCE) in one physical resource block (PRB) pair showing an enhanced resource element group (EREG) index for each resource element (RE) in accordance with an example.

If the DCI indicates PRB 0, 1, 2 are allocated for PDSCH and the DCI itself is detected in PRB 0, UE can rate matching around PRB 0 and may only decode PDSCH from PRB 1, 2. One PRB pair may contain 2 or 4 ECCEs. FIG. 4 illustrates an example of four ECCEs (e.g., ECCE 0-4) in one PRB pair (e.g., slot n 120*c* and slot n+1 120*d*). FIG. 4 illustrates frequency first sequential mapping of RE across the REs for the ECCEs occupied by the DCI. The REs for the ECCE can be mapped around the demodulation reference signals (DMRS). The number labeled in each RE is the EREG index. In an example, the same EREG index can be used for each aggregation level. In another example (not shown), time first sequential mapping of RE across the REs for the ECCEs occupied by the DCI can be used.

FIG. 3 illustrates a challenge due to aggregation level ambiguity. For localized EPDCCH, if both PRB 0 and PRB 1 are allocated for EPDCCH transmission, and if the eNB uses resource allocation type 0 or 2 to allocate PRB pairs for a UE, the eNB can transmit a DCI with aggregation level 4 (AL4) in PRB 0 302A and the UE may successfully decode the DCI with aggregation level 8 (AL8) from PRB 0 302A and PRB1 302B. With a successfully decoded DCI in PRB 0 and PRB1, the UE may assume PRB 0 and 1 are used for EPDCCH, so the UE may only try to decode PDSCH from PRB 2. So the PDSCH on PRB 1 may not be decoded (e.g., may be lost), so the information may need to be resent, which can cause a performance degradation for the PDSCH.

Figure 5:
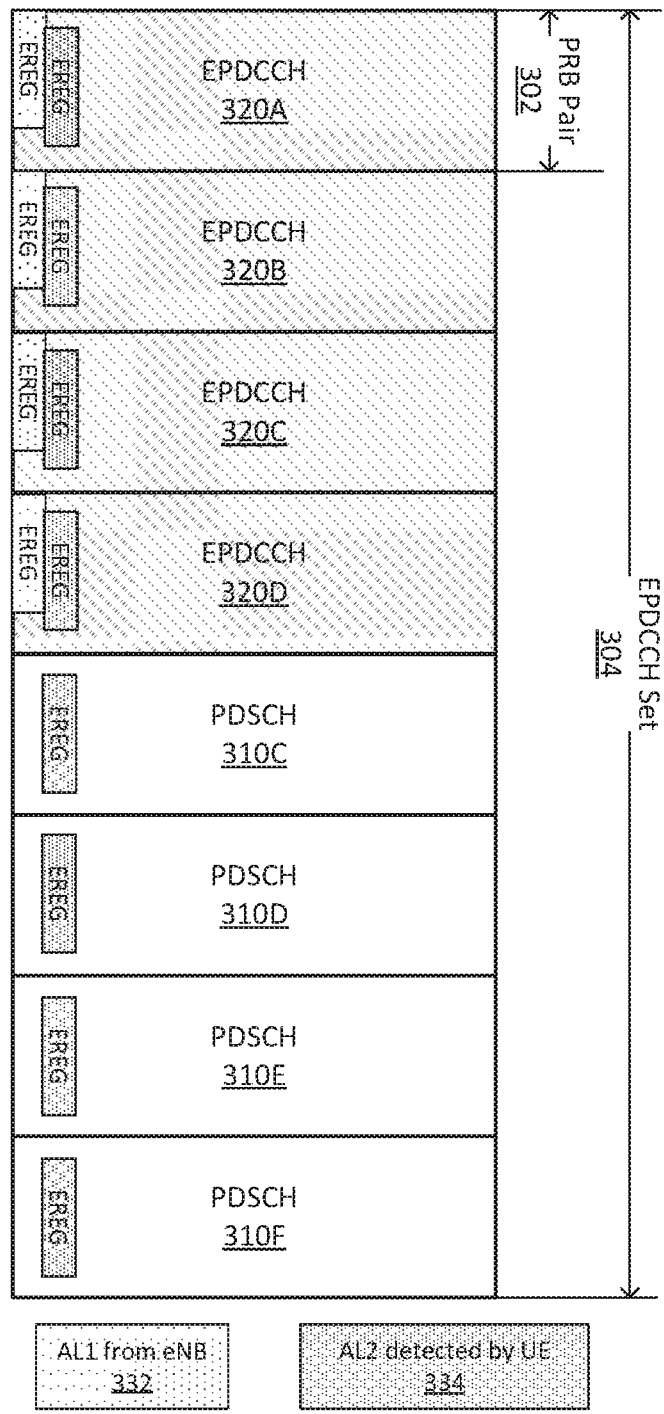
FIG. 5 illustrates an example for aggregation level (AL) ambiguity for distributed enhanced physical downlink control channel (EPDCCH) in accordance with an example.

FIG. 5 illustrates a challenge due to aggregation level ambiguity for distributed EPDCCH transmission. For distributed EPDCCH transmission, when a number of PRB pairs in one distributed EPDCCH set is greater than a number of EREGs one distributed ECCE contains, the UE can decode the EREGs from the PRB pairs in the one distributed EPDCCH set. For example, as shown in FIG. 5, one EPDCCH set 304 contains eight PRB pairs 302 and one ECCE can contain four EREGs 332 in the EPDCCH 320A-D. If the eNB transmits DCI with aggregation level 1 (AL1)

332 and UE decodes the DCI successfully, assuming aggregation level 2 (AL2) 334, AL4, or AL8, since an aggregation level more than AL1 (e.g., AL2, AL4, or AL8) can occupy all the PRB pairs in the distributed EPDCCH set, then UE can rate match around all the PRBs for PDSCH decoding. So the PDSCH 310C-F may not be decoded (e.g., may be lost), so the information may need to be resent, which can again cause a performance degradation for the PDSCH.

Figure 6:
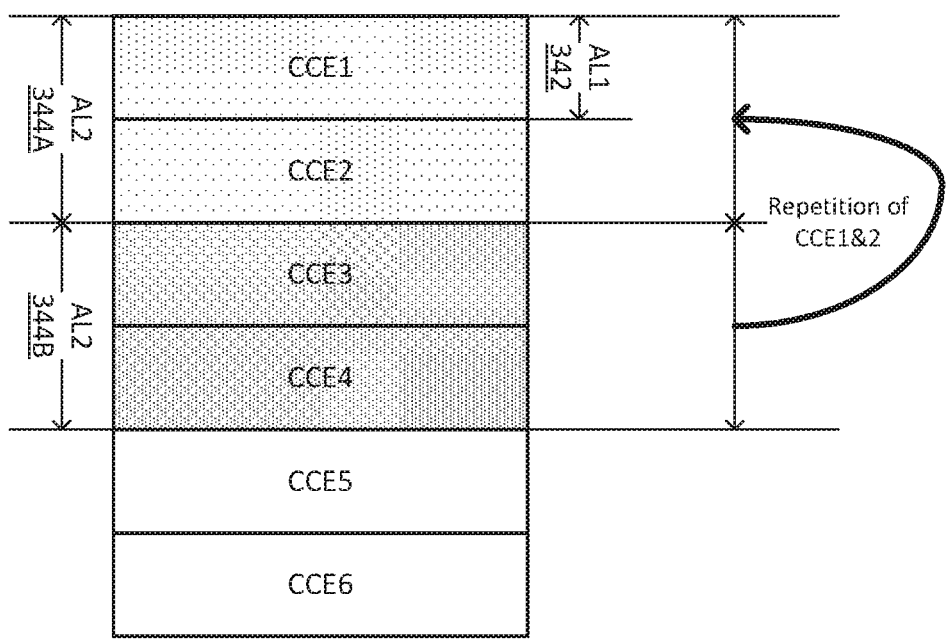
FIG. 6 illustrates an example for aggregation level (AL) ambiguity in a user equipment's (UE's) blind decoding in accordance with an example.

Not only does aggregation level ambiguity present some challenges, but lowest ECCE ambiguity can also generate some inefficiencies in blind decoding. Based on a legacy definition of PDCCH search space (e.g., as defined in 3GPP LTE standard Release 8 Technical Specification (TS) 36.213), the resources of one aggregation level that the UE monitors for PDCCH blind detection can overlap with the resources of another aggregation level. For example, FIG. 6 shows overlapping CCEs, where the UE can monitor CCE {1,2,3,4,5,6} to detect DCI with aggregation level 1 and monitor CCE {1&2,3&4,5&6} to detect DCI with aggregation level 2.

Since rate matching can be used to generate the DCI, the payloads in CCE 2 (AL1 342), in an example, can be an exact repetition of payloads in CCE 1. Similarly, the payloads in CCE 3-4 (AL2 344B), in an example, can be an exact repetition of payloads in CCE 1-2 (AL2 344A). A lowest CCE index confusion issue or lowest ECCE ambiguity can result. For legacy PDCCH, padding zero bits can be used to make the payload size of DCI not equal to any one of {12, 14, 16, 20, 24, 26, 32, 40, 44, 56} as in as defined in 3GPP LTE standard Release 8 TS 36.212. Padding zero bits may not be available for EPDCCH.

The payload size {12, 14, 16, 20, 24, 26, 32, 40, 44, 56} is optimized in 3GPP LTE standard Release 8 TS 36.212 with an assumption that CCE size is 36 REs. However, in the EPDCCH design the ECCE size can be variable due to different configuration of cell-specific reference signals (CRS), channel state information reference signals (CSI-RS), and/or legacy control. So the DCI size can be optimized for EPDCCH considering different ECCE sizes.

For example, a payload size that can result in aggregation level confusion issue can satisfy the criteria represented by $n*3/2*k=m*n\_cce$, where k and m are integers, and m={1 2 4 8 16}, n represents a payload size, m represents a number of occupied CCEs, k represents a starting point of repetitions of the coded block, n_cce represents a size of an ECCE, and n is less than $(16-m)*n\_cce*2*3/4$. The coding rate can be less than ¾; otherwise, the UE may not decode the payload.

Based on the criteria of the example, the payload sizes (e.g., raw payload size 48 or 28) that can cause aggregation level confusion for different ECCE sizes (e.g., 12, 24, or 33) is illustrated in Table 1. Table 1 illustrates payload sizes that can cause aggregation confusion for different ECCE sizes (m=1.2.4.8.16).

TABLE 1

| ECCE Size | Payloads including 16 bits CRC | Raw Payload Size |
|---|---|---|
| 12 | 64 | 48 |
| 24 | 64 | 48 |
| 33 | 44 | 28 |

To assist in resolving some aggregation level confusion, 3GPP LTE standard Release 11 (e.g., V11.1.0 (2012-12)) Technical Specification (TS) 36.212 Table 5.3.3.1.2-1 can be modified to include 28 and 48 information bits for ambiguous sizes, represented by Table 2.

TABLE 2

{12, 14, 16, 20, 24, 26, 28, 32, 40, 44, 48, 56}

In another example, a forward compatible table to include m=1, 2, 3, . . . , 16, as shown in Table 3, can be used instead of the aggregation levels the UE monitors (m=1,2,4,8,16). Table 3 illustrates payload sizes that can cause aggregation confusion for different ECCE sizes (m=1,2,3, . . . , 16). Table 2 is defined including the payload sizes that can lead to aggregation level ambiguity given different aggregation levels.

TABLE 3

| ECCE Size | Payloads including 16 bits CRC | Raw Payload size |
|---|---|---|
| 11 | 33, 44, 66 | 17, 28, 50 |
| 12 | 44, 52, 64 | 28, 36, 48 |
| 13 | 39, 52 | 23, 36 |
| 15 | 35, 45, 50, 55, 65, 70 | 19, 29, 34, 39, 49, 54 |
| 16 | 64 | 48 |
| 17 | 34, 51, 68 | 18, 35, 52 |
| 18 | 33, 39, 44, 52, 54, 66 | 17, 23, 28, 36, 38, 50 |
| 19 | 38, 57 | 22, 41 |
| 21 | 35, 49, 63, 70 | 19, 33, 47, 54 |
| 22 | 33, 44, 66 | 17, 28, 50 |
| 23 | 46, 69 | 30, 53 |
| 24 | 44, 52, 64 | 28, 36, 48 |
| 25 | 50 | 34 |
| 26 | 39, 52 | 23, 36 |
| 27 | 33, 39, 45, 54, 63, 66 | 17, 23, 29, 38, 47, 50 |
| 28 | 35 | 19 |
| 29 | 29, 58 | 13, 42 |
| 30 | 35, 44, 45, 50, 52, 55, 65, 70 | 19, 28, 29, 34, 36, 39, 49, 54 |
| 31 | 31, 62 | 15, 46 |
| 32 | 64 | 48 |
| 33 | 33, 44, 55, 66 | 17, 28, 39, 50 |
| 34 | 34, 51, 68 | 18, 35, 52 |
| 35 | 35, 50, 70 | 19, 34, 54 |

Figures 7A, 7B:
FIG. 7A illustrates a diagram of aggregation level (AL) specific frequency first mapping for AL 2 in accordance with an example.
FIG. 7B illustrates a diagram of aggregation level (AL) specific frequency first mapping for AL 1 in accordance with an example.

Various methods can be used to resolve the aggregation level ambiguity and the lowest ECCE ambiguity. For example, a unique frequency first or time first sequential mapping across the REs occupied by the DCI may be used for each aggregation level (e.g., alternative one). FIG. 7A illustrates an EREG index map for an AL 2 354. FIG. 7B illustrates an EREG index map for an AL 1 352. FIG. 4 illustrates an EREG index map that can be used for an AL 4 or AL 8. The EREG index map (not shown) can also use a separate time first sequential EREG index map for AL 1, AL 2, or AL 4 or AL 8.

Instead of mapping modulated symbols to REs in one ECCE and then mapping to REs in another ECCE as used for legacy PDCCH, the eNB can use a frequency first or time first mapping across the REs that are used to transmit the DCI (i.e., mapping across both the ECCE and the EREG). Since each EREG/ECCE can be distributed in one PRB pair, the aggregation level mapping can result in different symbol mapping order for different aggregation levels and different EREGs. Even if repetition exists in the encoded bits (see FIG. 6), the UE may not decode the DCI correctly with an incorrect AL assumption (e.g., resolving AL ambiguity) or incorrect starting ECCE assumption (e.g., resolving lowest ECCE ambiguity). Using an aggregation level EREG index map can solves both AL ambiguity and lowest ECCE ambiguity.

Figure 8:
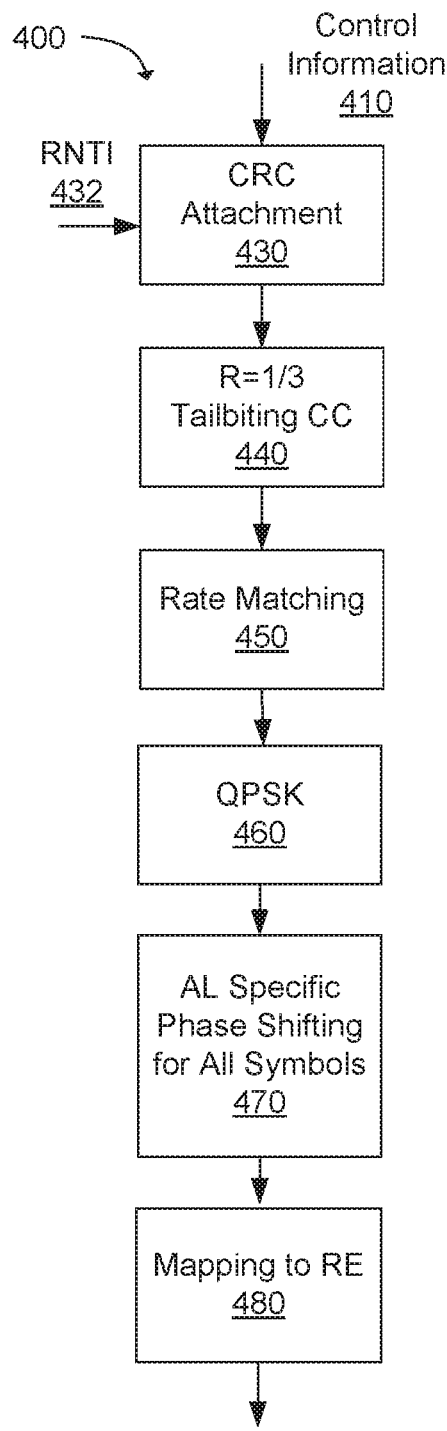
FIG. 8 illustrates a flow diagram for enhanced physical downlink control channel (EPDCCH) processing at a node with aggregation level (AL) specific phase shifting in accordance with an example.

In another example, aggregation level ambiguity can be resolved using an aggregation level specific phase shifting for all modulated symbols 470 (e.g., alternative two), as illustrated in FIG. 8. FIG. 8 illustrates physical channel processing 400 for an eNB. As previously discussed, a UE unique identifier, such as a cell-RNTI (C-RNTI), can be used to mask the DCI. A cyclic redundancy check (CRC) can be used for error detection in DCI messages. The entire PDCCH payload can be used to calculate a set of CRC parity bits. The CRC parity bits can then be appended to the end of the PDCCH payload. During CRC attachment 430, control information 410 (e.g., DCI) for a UE can be masked with the RNTI 432 of the UE.

The RNTI can be used for scrambling the cyclic redundancy check (CRC) attached to a specific DCI format. Cyclic redundancy check (CRC) can be an error detecting code appended to a block of data to be transmitted. The value of the CRC can be calculated from the block of data. The length of the CRC can determine the number of errors which can be detected in the block of data on reception of the data. A CRC may not be able to correct errors or determine which bits are erroneous.

Then the DCI message with the CRC attachment can undergo channel coding, such as tail biting convolutional coding (CC) 440, by a channel encoder. Convolutional coding is a form of forward error correction. Convolutional coding can improve the channel capacity by adding carefully selected redundant information. For example, LTE can use a rate 1/3 tail biting encoder with a constraint length k=7, which means that one in three bits of the output contain 'useful' information while the other two add redundancy. A tail biting convolutional coder can initialize its internal shift register to the last k bits of the current input block, rather than to an 'all zeros' state, which means the start and end states can be the same, without the need to zero pad the input block. The overhead of 'terminating' the coder can be eliminated, so the output block can contain fewer bits than a standard convolutional coder.

At the UE, the tail biting convolutional decoder design may be more complicated since the initial state may be unknown, but the decoder knows the start and end states are the same. In another example, a channel decoder can be implemented using a Viterbi algorithm.

A rate matching 450 module can create an output bitstream with a desired code rate, as previously discussed. A modulator can be used to modulate the output bitstream. The modulator can use various modulation and coding schemes (MCS), such as quadrature phase-shift keying (QPSK) 460 modulation. Modulation is the process of varying one or more properties of a periodic waveform, called the carrier signal, with a modulating signal which typically contains information to be transmitted (e.g., DCI).

A module (e.g., AL specific phase shifter) can provide an aggregation level specific phase shifting for all modulated symbols 470. For example, AL specific phase shifting can be added in addition to an EPDCCH generation procedure. For instance, if four aggregation levels can be used for EPDCCH transmission, each AL can be assign one of four phase shifting factors (e.g., {1 j -1 -j}). The eNB can select one shifting factor according to the aggregation level and multiply on all the modulated symbols (e.g., QPSK modulated symbols). The phase shifting factor can be used to solve the AL ambiguity issue.

In another example, on top of AL specific phase shifting, EREG specific phase shifting for the EREGs within one PRB pair may also be used. The EREG specific phase shifting for the EREGs can solve the lowest ECCE ambiguity issue. The EREG shifting factor can be the same or different with aggregation level specific shifting factors.

After aggregation level specific phase shifting, the phase shifted modulated symbols can be mapped to resource elements 480 by a mapper on one or various layers (e.g., REs can be shown in FIG. 4).

Figure 9:
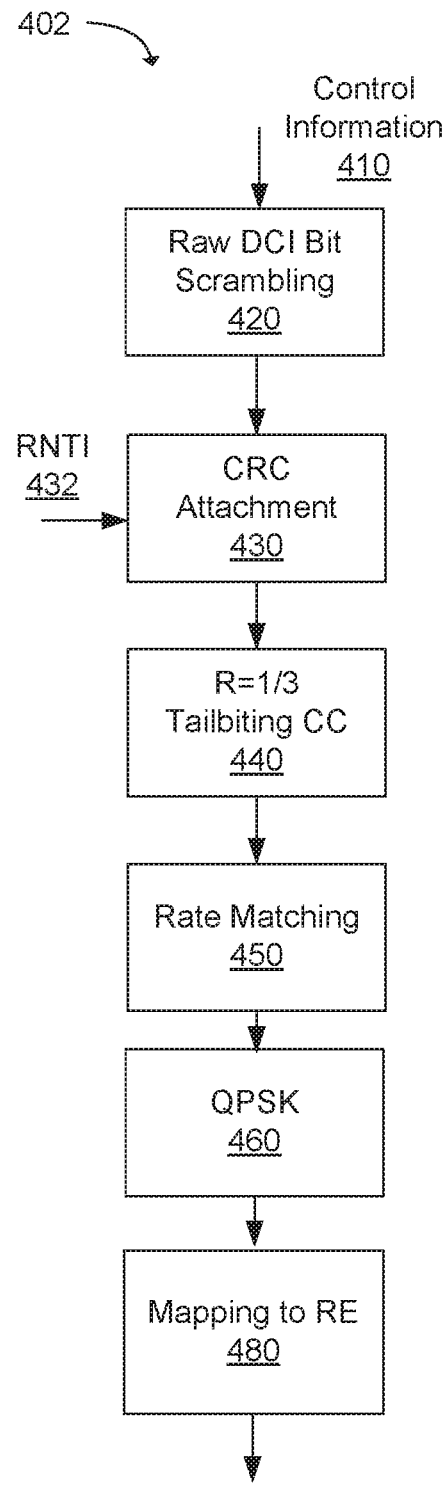
FIG. 9 illustrates a flow diagram for enhanced physical downlink control channel (EPDCCH) processing at a node with aggregation level (AL) specific scrambling of downlink control information (DCI) in accordance with an example.

In another example, aggregation level ambiguity can be resolved using an aggregation level specific scrambling on the uncoded (e.g., raw) DCI bits 420 (e.g., alternative three) using an aggregation level specific scrambler, as illustrated in FIG. 9. FIG. 9 illustrates physical channel processing 402 for an eNB. The scrambling sequence can have the same length as the uncoded DCI bits. For instance, for four aggregation levels, the sequences could be:
[0 0 . . . 0]
[1 1 . . . 1]
[0 1 0 1 . . . 0 1]
[1 01 0 . . . 1 0]

Other scrambling sequence patterns (not shown) may also be used. Each aggregation level (e.g., 1, 2, 4, 8, 16, or 32) can use a different and unique scrambling sequence pattern. After raw DCI bit aggregation level specific scrambling 420, the DCI bits can undergo CRC attachment 430 and other physical channel processing 402 operations, as previous described.

In another configuration (e.g., alternative four), for distributed EPDCCH transmission, the AL ambiguity may only occur when the eNB transmits with AL1 and the UE decodes correctly with AL2, AL4, or ALB, in the case where the number of PRB pairs in the distributed EPDCCH set is greater than number of EREGs one ECCE includes. So two AL specific factors may be used for distributed EPDCCH transmission (e.g., {1-1}) for phase shifting (e.g., similar to alternative two except the number of shifting factors) or using two sequences to scramble the DCI (e.g., similar to alternative three except using two scrambling sequences). For example, one of the two scrambling sequences can use an all 'zero' sequence (e.g., sequence A) and the other scrambling sequence can use an all 'one' sequence (e.g., sequence B). Alternative four can combine and use alternatives two and three. Alternative four can provide complexity reduction optimization for a particular distributed EPDCCH set size. The various alternatives (e.g., alternatives 1, 2, 3, and 4) can also be directly applied to both localized and distributed EPDCCH set regardless of a number of PRB pairs per set and a number of EREGs per ECCE.

Figure 10:
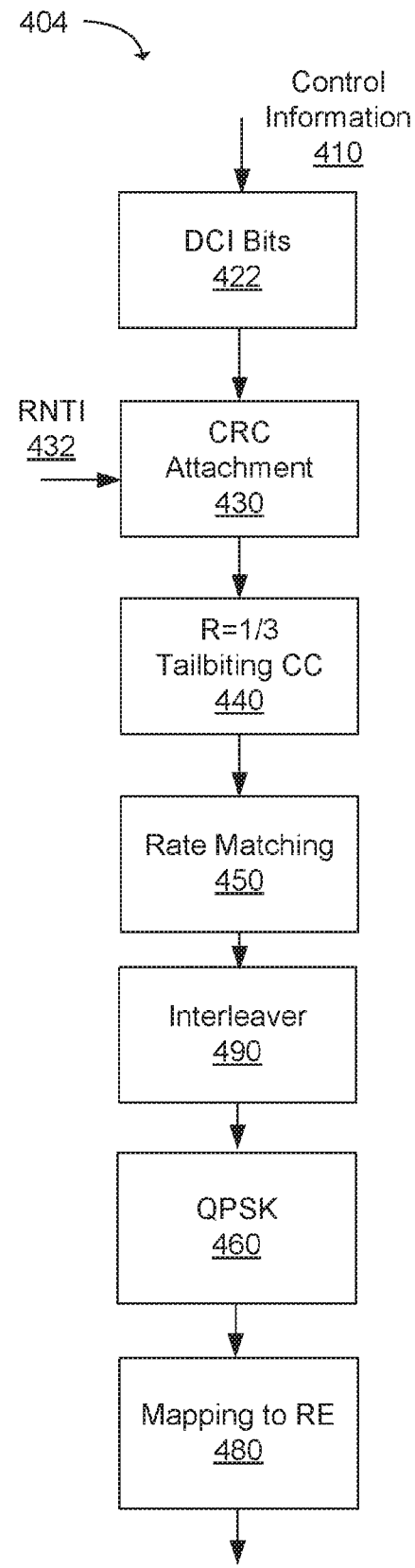
FIG. 10 illustrates a flow diagram for enhanced physical downlink control channel (EPDCCH) processing at a node with an interleaver after rate matching in accordance with an example.

In another example, the aggregation level ambiguity or the lowest ECCE ambiguity can be resolved using an interleaver 490 after rate matching 450 (e.g., alternative five) where DCI bits 422 are provide for CRC attachment 430, as illustrated in FIG. 10. The interleaver can be used to interleave against a fading phenomenon. To make the UE unable to decode the EPDCCH correctly under an incorrect aggregation level assumption, a bit level interleaver 490 can be inserted between the rate matching block 450 and modulation block 460, as shown in FIG. 10. Any interleaver may be applicable as long as the interleaving destroys an encoding chain if the UE assumes an incorrect aggregation level in blind decoding. Since the legacy PDCCH can use an interleaver for REG interleaving, the same interleaver can be reused for simplicity (i.e., a sub-block interleaver can be reused). In an example, <NULL> elements at the output of the interleaver can be removed before modulation.

Figure 11:
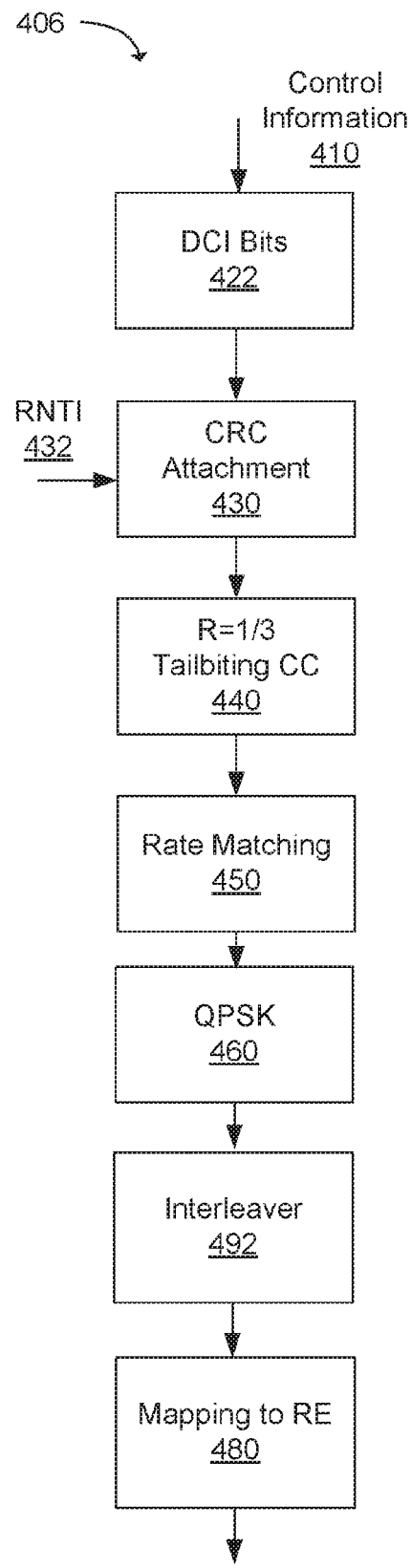
FIG. 11 illustrates a flow diagram for enhanced physical downlink control channel (EPDCCH) processing at a node with an interleaver after modulation in accordance with an example.

In another example, the aggregation level ambiguity or the lowest ECCE ambiguity can be resolved using an interleaver 492 after modulation (e.g., QPSK 460) (e.g., alternative six), as illustrated in FIG. 11. Similar to alternative five, a symbol level interleaver can be inserted between the QPSK 460 modulation block and the symbol to RE mapping block 480, as shown in FIG. 11. For example, a sub-block interleaver can be reused. For instance, <NULL> elements at the output of the interleaver can be removed before RE mapping.

Figure 12:
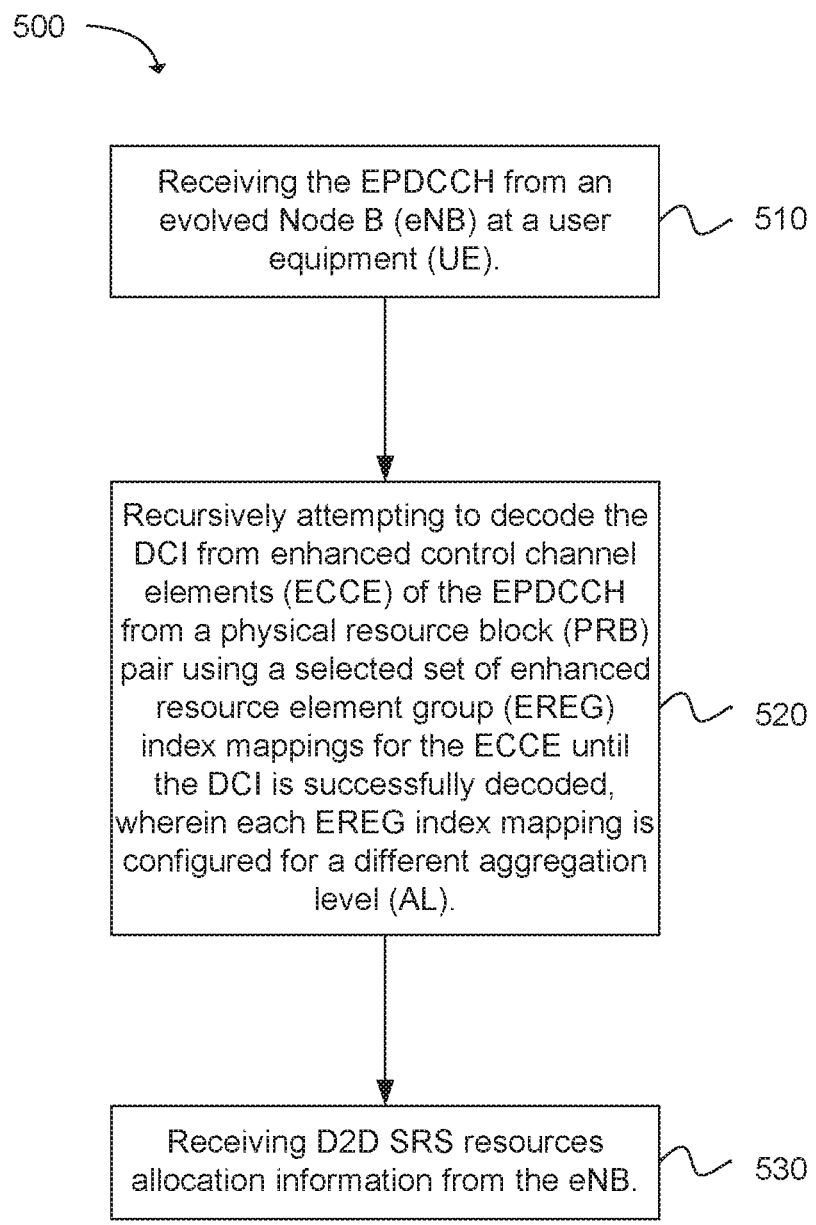
FIG. 12 depicts a flow chart of a method for blind decoding downlink control information (DCI) from an enhanced physical downlink control channel (EPDCCH) in accordance with an example.

Another example provides a method 500 for blind decoding downlink control information (DCI) from an enhanced physical downlink control channel (EPDCCH), as shown in the flow chart in FIG. 12. The method may be executed as instructions on a machine or computer circuitry, where the instructions are included on at least one computer readable medium or one non-transitory machine readable storage medium. The method includes the operation of receiving the EPDCCH from an evolved Node B (eNB) at a user equipment (UE), as in block 510. The operation of recursively attempting to decode the DCI from enhanced control channel elements (ECCE) of the EPDCCH from a physical resource block (PRB) pair using a selected set of enhanced resource element group (EREG) index mappings for the ECCE until the DCI is successfully decoded, wherein each EREG index mapping is configured for a different aggregation level (AL) follows, as in block 520. The next operation of the method can be correctly decoding the DCI when the EREG index mapping associated with a specified aggregation level is used, wherein the specified aggregation level is used to encode the DCI, as in block 530.

Each EREG index map can be used to determine which resource elements (RE) in a physical resource block (PRB) pair are associated with each ECCE. For example, the REs of a physical resource block (PRB) pair include a block of complex-valued symbols $y(0), \ldots, y(M_{symb}-1)$ mapped in sequence starting with $y(0)$ to resource elements $(k, l)$ on an associated antenna port when the REs are part of the EREGS assigned for the EPDCCH transmission, where $M_{symb}$ is a number of modulation symbols to transmit on a physical channel, and the mapping to resource elements $(k, l)$ on antenna port p is an increasing order of first an index k and then an index l, starting with a first slot and ending with a second slot in a subframe.

In an example, each ECCE can be distributed with other ECCEs in frequency or time in the PRB pair or multiple PRB pairs or each EREG can be distributed with other EREGs in frequency or time in the PRB pair or multiple PRB pairs. The operation of correctly decoding the DCI can further include determining the aggregation level, and determining a lowest ECCE value.

In another example, the method can further include failing to decode the DCI when an assumed aggregation level differs from an encoded aggregation level. A user equipment (UE) can attempt to decode with a EREG index mapping associated with the assumed aggregation level, and the encoded aggregation level can be the aggregation level used by an evolved Node B (eNB) to encode the DCI for transmission in the EPDCCH. The method can further include attempting to decode the DCI using another EREG index mapping associated with another aggregation level.

Figure 13:
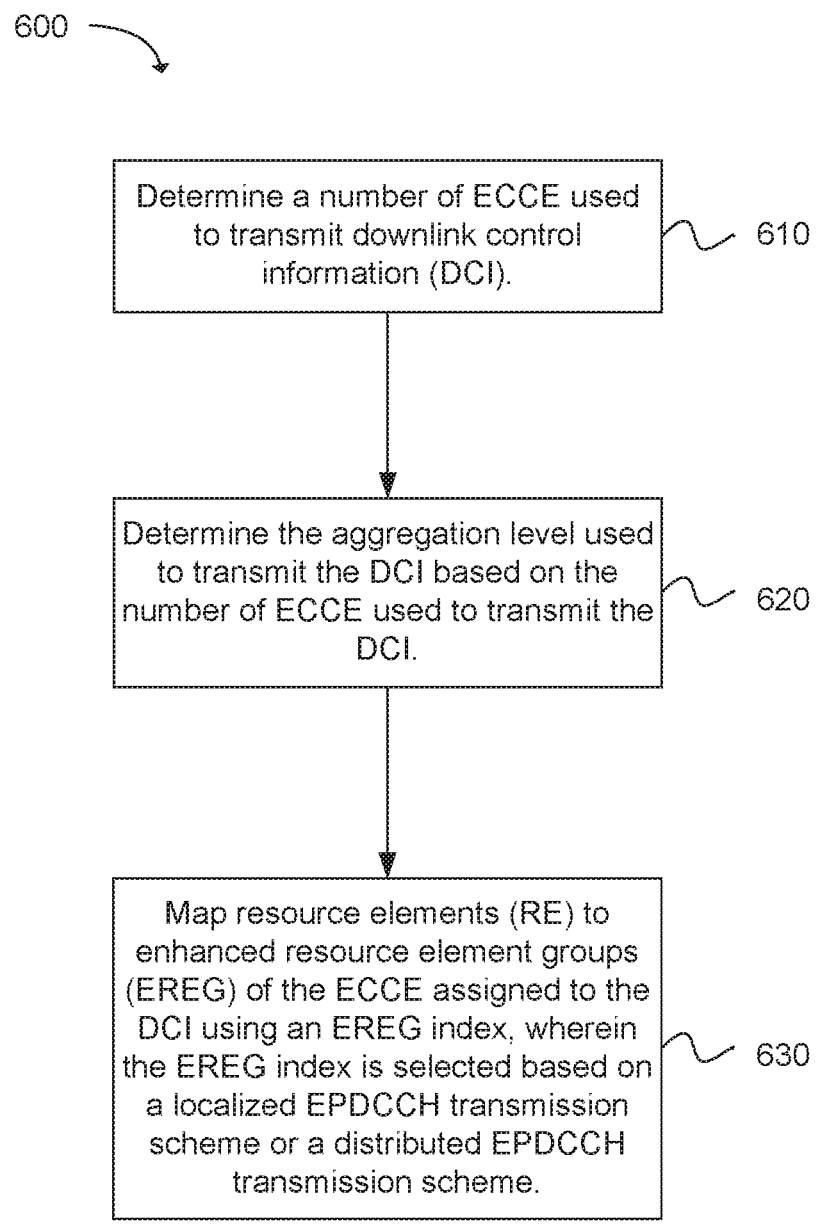
FIG. 13 depicts functionality of computer circuitry of a node operable for mapping resource elements (RE) to enhanced control channel elements (ECCE) of an enhanced physical downlink control channel (EPDCCH) based on an aggregation level (AL) in accordance with an example.

Another example provides functionality 600 of computer circuitry of a node operable for mapping resource elements (RE) to enhanced control channel elements (ECCE) of an enhanced physical downlink control channel (EPDCCH) based on an aggregation level (AL), as shown in the flow chart in FIG. 13. The functionality may be implemented as a method or the functionality may be executed as instructions on a machine, where the instructions are included on at least one computer readable medium or one non-transitory machine readable storage medium. The computer circuitry can be configured to determine a number of ECCE used to transmit downlink control information (DCI), as in block 610. The computer circuitry can be further configured to determine the aggregation level used to transmit the DCI based on the number of ECCE used to transmit the DCI, as in block 620. The computer circuitry can also be configured to map resource elements (RE) to enhanced resource element groups (EREG) of the ECCE assigned to the DCI using an EREG index, wherein the EREG index is selected based on a localized EPDCCH transmission scheme or a distributed EPDCCH transmission scheme, as in block 630.

In an example, the computer circuitry configured to map the RE can be further configured to map the RE to a physical resource block (PRB) pair for a localized EPDCCH transmission scheme using a frequency first sequential mapping across the REs occupied by the DCI, or map the RE to a plurality of PRB pairs a distributed EPDCCH transmission scheme using a frequency first sequential mapping across the REs occupied by the DCI, where one DCI for the distributed EPDCCH transmission scheme is carried using EREGs from the plurality of PRB pairs. In another example, the computer circuitry configured to map the RE can be further configured to map the RE to a physical resource block (PRB) pair for a localized EPDCCH transmission scheme using a time first sequential mapping across the REs occupied by the DCI, or map the RE to a plurality of PRB pairs a distributed EPDCCH transmission scheme using a time first sequential mapping across the REs occupied by the DCI, where one DCI for the distributed EPDCCH transmission scheme is carried using EREGs from the plurality of PRB pairs.

In a configuration, the ECCE can be transmitted in a physical resource block (PRB) pair, where each PRB pair includes four ECCEs or two ECCEs. The REs of a physical resource block (PRB) pair can include a block of complex-valued symbols $y(0), \ldots, y(M_{symb}-1)$ mapped in sequence starting with $y(0)$ to resource elements $(k,l)$ on an associated antenna port when the REs are part of the EREGS assigned for the EPDCCH transmission, where $M_{symb}$ is a number of modulation symbols to transmit on a physical channel, and the mapping to resource elements $(k,l)$ on antenna port p is an increasing order of first an index k and then an index l, starting with a first slot and ending with a second slot in a subframe.

The computer circuitry can be further configured to allocate resource to a physical downlink shared channel (PDSCH) with the EPDCCH allocate resource to a physical downlink shared channel (PDSCH) with the EPDCCH, and transmit the PDSCH in the resource allocation. The EPDCCH can be a localized EPDCCH or a distributed EPDCCH.

Figure 14:
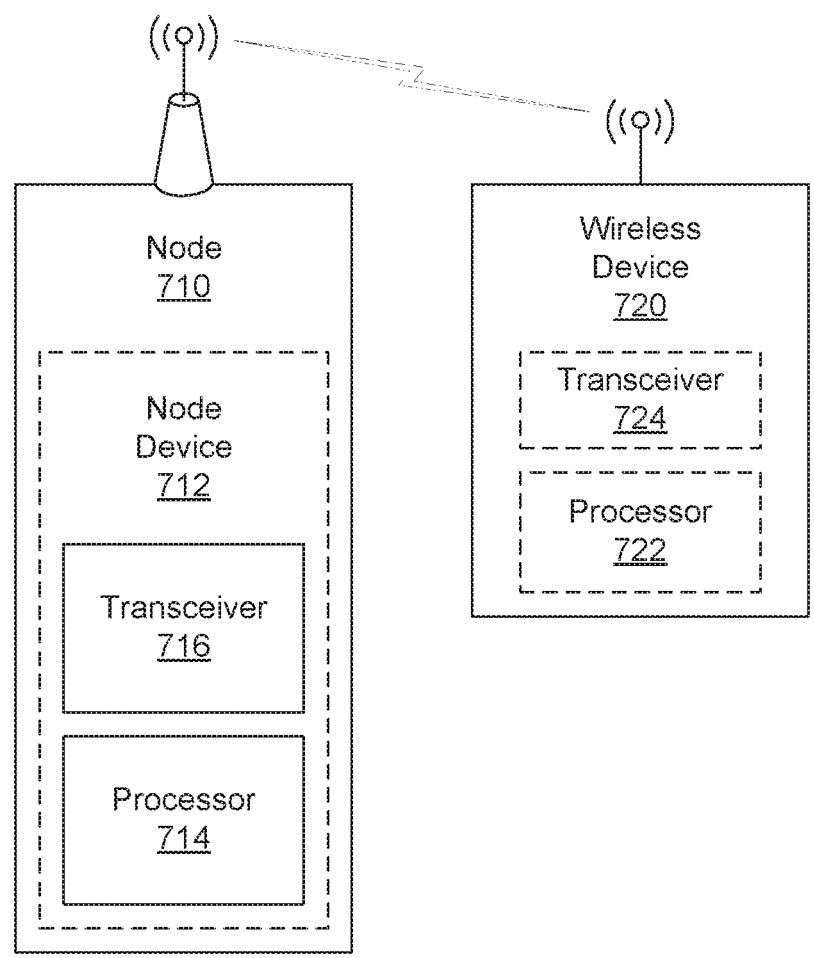
FIG. 14 illustrates a block diagram of a node (e.g., eNB) and wireless device (e.g., UE) in accordance with an example.

FIG. 14 illustrates an example node 710 (e.g., eNB) and an example wireless device 720 (e.g., UE). The node can include a node device 712. The node device or the node can be configured to communicate with the wireless device (e.g., UE). The node device can include a processor 714 and a transceiver 716. The processor 714 and/or transceiver 716 can be configured for mapping resource elements (RE) to enhanced control channel elements (ECCE) of an enhanced physical downlink control channel (EPDCCH) based on an aggregation level (AL), as described in 600 of FIG. 13.

The wireless device 720 (e.g., UE) can include a transceiver 724 and a processor 722. The wireless device (i.e., device) can be configured for blind decoding downlink control information (DCI) from an enhanced physical downlink control channel (EPDCCH), as described in 500 of FIG. 12.

Referring back to FIG. 14, the processor 722 can be configured to: Recursively attempt to decode the DCI from enhanced control channel elements (ECCE) of the EPDCCH from physical resource block (PRB) region candidates in a PRB set using a selected set of enhanced resource element group (EREG) index maps for the ECCE until the DCI is successfully decoded; and decode the DCI with an EREG index map associated with a same aggregation level used to encode the DCI. Each EREG index map can be configured for a different aggregation level (AL).

Each EREG index map can be used to determine which resource elements (RE) in a physical resource block (PRB) pair are associated with the ECCE for aggregation level. For example, the REs of a physical resource block (PRB) pair can include a block of complex-valued symbols y(0), . . . , $y(M_{symb}-1)$ mapped in sequence starting with y(0) to resource elements (k,l) on an associated antenna port when the REs are part of the EREGS assigned for the EPDCCH transmission, where $M_{symb}$ is a number of modulation symbols to transmit on a physical channel, and the mapping to resource elements (k,l) on antenna port p is an increasing order of first an index k and then an index l, starting with a first slot and ending with a second slot in a subframe.

In another example, the processor 714 can be further configured to fail to decode the DCI when an assumed aggregation level differs from an encoded aggregation level. The processor can attempt to decode with a EREG index map associated with the assumed aggregation level, and the encoded aggregation level can be the same aggregation level used by an evolved Node B (eNB) to encode the DCI for transmission in the EPDCCH.

The transceiver 716 can be configured to receive the EPDCCH from a node. The node can include a base station (BS), a Node B (NB), an evolved Node B (eNB), a baseband unit (BBU), a remote radio head (RRH), a remote radio equipment (RRE), a remote radio unit (RRU), or a central processing module (CPM).

In another configuration, transceiver 716 can be configured to receive a physical downlink shared channel (PDSCH) with the EPDCCH in a resource allocation (RA). The RA is a RA type 0, RA type 1 or a RA type 2 defined in a Third Generation Partnership Project (3GPP) Long Term Evolution (LTE) standard Release 11.

In another example, the same aggregation level is used to encode the DCI in 1, 2, 4, 8, 16, or 32 ECCE. In another configuration, the processor configured to decode the DCI can be further configured to resolve an aggregation level ambiguity; and resolve a lowest ECCE ambiguity.

Figure 15:
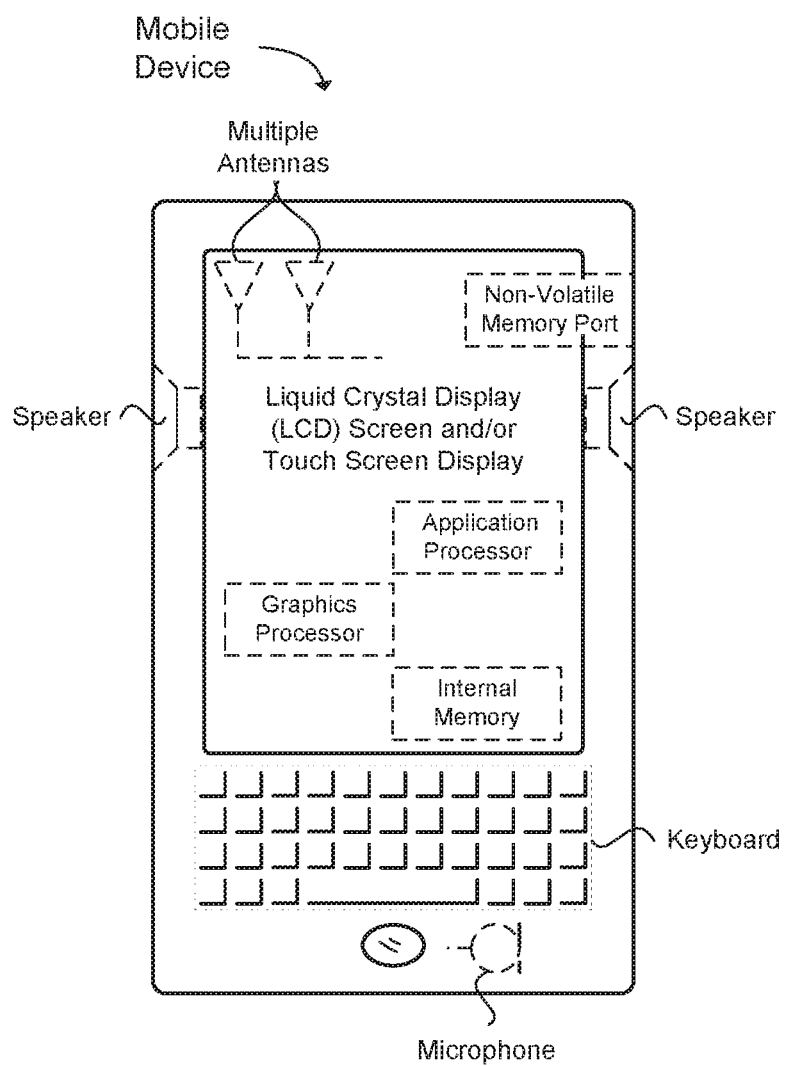
FIG. 15 illustrates a diagram of a wireless device (e.g., UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) configured for blind decoding downlink control information (DCI) from an enhanced physical downlink control channel (EPDCCH), the apparatus comprising one or more processors and memory configured to:
   receive, from a base station, the EPDCCH that includes the DCI; and
   attempt one or more times to decode the DCI from enhanced control channel elements (ECCE) of the EPDCCH from physical resource block (PRB) region candidates in a PRB set using a selected set of enhanced resource element group (EREG) index maps for the ECCE until the DCI is successfully decoded.

2. The apparatus of claim 1, wherein resource elements (REs) of a PRB pair include a block of symbols mapped in sequence to REs on an associated port when the REs of the PRB pair are part of EREGs assigned for the EPDCCH transmission.

3. The apparatus of claim 1, wherein the one or more processors and memory is further configured to decode the DCI with an EREG index map associated with a same aggregation level used to encode the DCI.

4. The apparatus of claim 1, wherein each EREG index map is configured for a different aggregation level (AL), and resource elements (REs) of a PRB pair include a block of complex-valued symbols $y(0), \ldots, y(M_{symb}-1)$ mapped in sequence starting with $y(0)$ to resource elements (k, l) on the associated antenna port when the REs are part of the EREGS assigned for the EPDCCH transmission, where $M_{symb}$ is a number of modulation symbols to transmit on a physical channel, and the mapping to resource elements (k, l) on antenna port p is an increasing order of first an index k and then an index l, starting with a first slot and ending with a second slot in a subframe.

5. The apparatus of claim 1, wherein each EREG index map is used to determine which resource elements (RE) in a physical resource block (PRB) pair are associated with the ECCE for aggregation level.

6. The apparatus of claim 1, wherein the one or more processors and memory is further configured to:
   fail to decode the DCI when an assumed aggregation level differs from an encoded aggregation level, wherein the processor attempts to decode with an EREG index map associated with the assumed aggregation level, and the encoded aggregation level is the same aggregation level used by an evolved Node B (eNB) to encode the DCI for transmission in the EPDCCH.

7. The apparatus of claim 1, wherein the one or more processors and memory is further configured to:
   receive a physical downlink shared channel (PDSCH) with the EPDCCH in a resource allocation (RA), wherein the RA is a RA type 0, RA type 1, or a RA type 2 defined in a Third Generation Partnership Project (3GPP) Long Term Evolution (LTE) standard Release 11; and
   rate match the PDSCH around a physical resource block (PRB) pair including the DCI in the EPDCCH.

8. The apparatus of claim 1, wherein the same aggregation level is used to encode the DCI in 1, 2, 4, 8, 16, or 32 ECCE.

9. The apparatus of claim 1, wherein the one or more processors and memory configured to decode the DCI is further configured to:
   resolve an aggregation level ambiguity; and
   resolve a lowest ECCE ambiguity.

10. An apparatus of a user equipment (UE) operable to perform blind decoding downlink control information (DCI)

from an enhanced physical downlink control channel (EPD-CCH), the apparatus comprising one or more processors and memory configured to:
  receive, at the UE from an evolved Node B (eNB), the EPDCCH along with a physical downlink shared channel (PDSCH) in a resource allocation (RA); and
  attempt, at the UE, one or more times to decode the DCI from enhanced control channel elements (ECCE) of the EPDCCH from a physical resource block (PRB) pair using a selected set of enhanced resource element group (EREG) index mappings for the ECCE until the DCI is successfully decoded.

11. The apparatus of claim 10, wherein each EREG index mapping is configured for a different aggregation level (AL), wherein rate matching is performed on the PDSCH around the PRB pair including the DCI in the EPDCCH.

12. The apparatus of claim 10, wherein the RA that includes the EPDCCH and the PDSCH is a RA type 0, RA type 1, or a RA type 2 defined in a Third Generation Partnership Project (3GPP) Long Term Evolution (LTE) standard Release 11.

13. The apparatus of claim 10, wherein the one or more processors and memory is further configured to decode the DCI successfully when the EREG index mapping associated with a specified aggregation level is used, wherein the specified aggregation level is used to encode the DCI.

14. The apparatus of claim 10, wherein each EREG index map is used to determine which resource elements (RE) in a physical resource block (PRB) pair are associated with each ECCE.

15. The apparatus of claim 10, wherein the REs of the PRB pair include a block of complex-valued symbols $y(0), \ldots, y(M_{symb}-1)$ mapped in sequence starting with $y(0)$ to resource elements (k,l) on an associated antenna port when the REs are part of the EREGS assigned for the EPDCCH transmission, where $M_{symb}$ is a number of modulation symbols to transmit on a physical channel, and the mapping to resource elements (k,l) on antenna port p is an increasing order of first an index k and then an index l, starting with a first slot and ending with a second slot in a subframe.

16. The apparatus of claim 10, wherein each ECCE is distributed with other ECCEs in frequency or time in the PRB pair or multiple PRB pairs or each EREG is distributed with other EREGs in frequency or time in the PRB pair or multiple PRB pairs.

17. The apparatus of claim 10, wherein the one or more processors and memory is configured to decode the DCI is further configured to:
  determine an aggregation level; and
  determine a lowest ECCE value.

18. The apparatus of claim 10, wherein the one or more processors and memory is further configured to:
  fail to successfully decode the DCI when an assumed aggregation level differs from an encoded aggregation level, wherein a user equipment (UE) then attempts to decode with a EREG index mapping associated with the assumed aggregation level, and the encoded aggregation level is an aggregation level used by an evolved Node B (eNB) to encode the DCI for transmission in the EPDCCH; and
  attempt to decode the DCI using another EREG index mapping associated with another aggregation level.

19. At least one non-transitory machine readable storage medium having instructions embodied thereon for mapping, at a base station, resource elements (RE) to enhanced control channel elements (ECCE) of an enhanced physical downlink control channel (EPDCCH), the instructions when executed by one or more processors of the base station perform the following:
  determining a number of ECCE used to transmit downlink control information (DCI); and
  mapping resource elements (RE) to enhanced resource element groups (EREG) of the ECCE assigned to the DCI using an EREG index.

20. The at least one non-transitory machine readable storage medium of claim 19, further comprising instructions which when executed by the at least one processor of the base station performs the following: determining an aggregation level used to transmit the DCI based on the number of ECCE used to transmit the DCI.

21. The at least one non-transitory machine readable storage medium of claim 19, wherein the EREG index is selected based on a localized EPDCCH transmission scheme or a distributed EPDCCH transmission scheme.

22. The at least one non-transitory machine readable storage medium of claim 19, further comprising instructions which when executed by the at least one processor of the base station performs the following:
  mapping the RE to a physical resource block (PRB) pair for the localized EPDCCH transmission scheme using a frequency first sequential mapping across the REs occupied by the DCI; or
  mapping the RE to a plurality of PRB pairs for the distributed EPDCCH transmission scheme using a frequency first sequential mapping across the REs occupied by the DCI, wherein one DCI for the distributed EPDCCH transmission scheme is carried using EREGs from the plurality of PRB pairs.

23. The at least one non-transitory machine readable storage medium of claim 19, further comprising instructions which when executed by the at least one processor of the base station performs the following:
  mapping the RE to a physical resource block (PRB) pair for the localized EPDCCH transmission scheme using a time first sequential mapping across the REs occupied by the DCI; or
  mapping the RE to a plurality of PRB pairs for the distributed EPDCCH transmission scheme using a time first sequential mapping across the REs occupied by the DCI, wherein one DCI for the distributed EPDCCH transmission scheme is carried using EREGs from the plurality of PRB pairs.

24. The at least one non-transitory machine readable storage medium of claim 19, wherein the ECCE is transmitted in a physical resource block (PRB) pair and each PRB pair includes four ECCEs or two ECCEs.

25. The at least one non-transitory machine readable storage medium of claim 19, wherein the REs of the PRB pair include a block of complex-valued symbols $y(0), \ldots, y(M_{symb}-1)$ mapped in sequence starting with $y(0)$ to resource elements (k, l) on an associated antenna port when the REs are part of the EREGS assigned for the EPDCCH transmission, where $M_{symb}$ is a number of modulation symbols to transmit on a physical channel, and the mapping to resource elements (k,l) on antenna port p is an increasing order of first an index k and then an index l, starting with a first slot and ending with a second slot in a subframe.

26. The at least one non-transitory machine readable storage medium of claim 19, further comprising instructions which when executed by the at least one processor of the base station performs the following:
  allocating resource to a physical downlink shared channel (PDSCH) with the EPDCCH; and
  transmitting the PDSCH in the resource allocation.

* * * * *